(12) United States Patent
Fiveland et al.

(10) Patent No.: US 9,976,517 B2
(45) Date of Patent: May 22, 2018

(54) DIRECT INJECTION SYSTEM AND METHOD

(71) Applicant: Caterpillar Inc., Peoria, IL (US)

(72) Inventors: Scott B. Fiveland, Metamora, IL (US); David Montgomery, Edelstein, IL (US)

(73) Assignee: Caterpillar Inc., Deerfield, IL (US)

(*) Notice: Subject to any disclaimer, the term of this patent is extended or adjusted under 35 U.S.C. 154(b) by 330 days.

(21) Appl. No.: 14/843,178

(22) Filed: Sep. 2, 2015

(65) Prior Publication Data
US 2017/0058837 A1   Mar. 2, 2017

(51) Int. Cl.
*F02M 21/02*   (2006.01)
*F02M 21/06*   (2006.01)
*F02B 43/10*   (2006.01)

(52) U.S. Cl.
CPC ........ *F02M 21/0287* (2013.01); *F02M 21/06* (2013.01); *F02B 2043/103* (2013.01); *Y02T 10/32* (2013.01)

(58) Field of Classification Search
CPC ........... F02M 21/0209; F02M 21/0218; F02M 21/023; F02M 21/0239; F02M 21/0245; F02M 21/0275; F02M 21/0287; F02M 21/06; F02B 2043/103
See application file for complete search history.

(56) References Cited

U.S. PATENT DOCUMENTS

| 4,742,801 | A | * | 5/1988 | Kelgard | F02B 3/00 123/27 GE |
|---|---|---|---|---|---|
| 5,373,700 | A | * | 12/1994 | McIntosh | F17C 9/02 123/525 |
| 5,390,646 | A | * | 2/1995 | Swenson | F02B 29/0412 123/525 |
| 5,832,906 | A | * | 11/1998 | Douville | F17C 5/06 123/527 |
| 7,373,931 | B2 | | 5/2008 | Lennox et al. | |
| 2009/0239426 | A1 | * | 9/2009 | Levander | B63B 25/12 440/88 F |
| 2010/0005812 | A1 | * | 1/2010 | Watts | F17C 5/06 62/50.2 |

(Continued)

FOREIGN PATENT DOCUMENTS

CN   102678391 A   9/2012
EP   2762715   8/2014

(Continued)

*Primary Examiner* — Erick Solis
*Assistant Examiner* — Anthony L Bacon
(74) *Attorney, Agent, or Firm* — Baker, Hostetler, Leydig, Voit & Mayer, LTD.

(57) ABSTRACT

The disclosure describes a system for pressurizing a fluid. The system includes a source of liquid fuel, a pressure build chamber in fluid communication with the source of liquid fuel such that the pressure build chamber is configured to receive a volume of liquid fuel from the source, wherein the pressure build chamber is configured to heat a portion of the volume of liquid fuel to a sufficient temperature to convert the portion of the volume of liquid fuel into a gaseous fuel or supercritical fluid, and wherein the pressure build chamber is configured to increase a pressure of a fluid in the pressure build chamber to a threshold pressure to inject the gaseous fuel or supercritical fluid into an engine.

19 Claims, 3 Drawing Sheets

(56) References Cited

U.S. PATENT DOCUMENTS

| | | | |
|---|---|---|---|
| 2012/0312280 A1* | 12/2012 | Jaasma | F02D 19/0647 123/456 |
| 2013/0311067 A1 | 11/2013 | Stockner et al. | |
| 2014/0069118 A1 | 3/2014 | Jung et al. | |
| 2014/0182559 A1 | 7/2014 | Steffen et al. | |
| 2014/0250921 A1* | 9/2014 | Kang | B63H 21/38 62/49.1 |
| 2014/0290280 A1 | 10/2014 | Lee | |
| 2014/0299101 A1* | 10/2014 | Melanson | F17C 5/06 123/445 |
| 2014/0318503 A1* | 10/2014 | Kang | F02M 37/0052 123/506 |
| 2015/0369228 A1* | 12/2015 | Kounosu | F17C 13/04 123/27 GE |

FOREIGN PATENT DOCUMENTS

| | | |
|---|---|---|
| JP | 06008623 | 2/1994 |
| JP | 2005-351299 A | 12/2005 |
| WO | 2013047574 A1 | 4/2013 |
| WO | 2014091061 | 6/2014 |

* cited by examiner

DIRECT INJECTION SYSTEM AND METHOD

TECHNICAL FIELD

This disclosure relates generally to internal combustion engines and, more particularly, to a direct injection system for gas engines.

BACKGROUND

A direct injection gas (DIG) engine is an engine in which a gaseous fuel, such as natural gas, is injected into a cylinder at high pressure while combustion in the cylinder from a diesel pilot is already underway. DIG engines operate on the gaseous fuel, and the diesel pilot provides ignition of the gaseous fuel. Another type of engine that uses more than one fuel is typically referred to as a dual-fuel engine, which uses a low-pressure gaseous fuel such as natural gas that is mixed at relatively low pressure with intake air admitted into the engine cylinders. Dual-fuel engines are typically configured to operate with liquid fuel such as diesel or gasoline at full power. The gaseous fuel is provided to displace a quantity of liquid fuel during steady state operation. The air/gaseous fuel mixture that is provided to the cylinder under certain operating conditions is compressed and then ignited using a spark, similar to gasoline engines, or using a compression ignition fuel, such as diesel, which is injected into the air/gaseous fuel mixture present in the cylinder.

In dual fuel engines, the gaseous fuel is stored in a pressurized state in a pressure tank, from which it exits in a gaseous state before being provided to the engine. In DIG engines, however, the gaseous fuel is stored in a liquid state at low pressure, such as atmospheric pressure, and at low, cryogenic temperatures in a liquid storage tank. After exiting the liquid storage tank, the liquefied gaseous fuel needs to be brought to a gaseous state before or when it is provided to the engine cylinders.

Conventional cryogenic pumps (e.g., a reciprocating piston pump) employ an intermittent pump operation (i.e., a start-stop operation) and may be used in DIG systems to pressurize the liquid natural gas (LNG). However, the high pressure and dynamic loads involved may contribute to a reduced life of the cryogenic pump. Therefore, systems using a high pressure cryogenic pump may incur unwanted downtime and maintenance costs.

International Patent Application WO2013047574 A1, titled, "Direct fuel injection diesel engine apparatus" ("the '574 Application"). The '574 Application is directed to a direct-injection diesel engine system that uses a cryogenic liquid fuel, such as liquefied natural gas. According to the '574 Application, the cold high-pressure cryogenic liquid fuel is pressurized by a booster pump installed in a fuel supply system for cryogenic liquid fuel. The direct fuel injection diesel engine apparatus uses high-pressure natural gas obtained by vaporizing LNG as an engine fuel, and burns the engine fuel with intake air pressurized by a supercharger, comprising a booster pump which pressurizes low-pressure LNG introduced from an LNG tank.

In the '574 Application, the LNG is provided in an LNG fuel feeding system which feeds and injects the high-pressure natural gas into a cylinder of a direct fuel injection diesel engine. A cold energy recovery heat exchanger cools a heating medium through heat exchange between the heating medium circulating in a closed circuit and high-pressure LNG pressurized by the booster pump. An air cooling heat exchanger cools atmospheric air which is taken in and introduced into the supercharger through heat exchange with the heating medium at a downstream portion of the cold energy recovery heat exchanger and/or intake air after compression by the supercharger. Such a configuration uses a high pressure booster pump to pressurize the LNG introduced from the LNG tank. These and other shortcomings of the prior art are addressed by the present disclosure.

SUMMARY

In one aspect, the present disclosure describes a direct injection system for an engine. The system may include a source of liquid fuel, a pressure build chamber in fluid communication with the source of liquid fuel such that the pressure build chamber is configured to receive a volume of liquid fuel from the source, wherein the pressure build chamber is configured to heat a portion of the volume of liquid fuel to a sufficient temperature to convert the portion of the volume of liquid fuel into a gaseous fuel or supercritical fluid, and wherein the pressure build chamber is configured to increase a pressure of a fluid in the pressure build chamber to a threshold pressure to inject the gaseous fuel or supercritical fluid into an engine.

In another aspect, a system may include a container including: a liquid fuel; a pressure build chamber in fluid communication with the container and configured to receive a volume of liquid fuel from the container, wherein the pressure build chamber is configured to heat a portion of the volume of liquid fuel to a sufficient temperature to convert the portion of the volume of liquid fuel into a gaseous fuel or supercritical fluid; a booster pump in fluid communication with the container and the pressure build chamber, wherein the booster pump is configured to cause the liquid fuel to flow toward the pressure build chamber; a separator in fluid communication with the pressure build chamber, wherein the separator is configured to separate at least a portion of the gaseous fuel or supercritical fluid from the liquid fuel; and a valve in fluid communication with the separator, wherein the valve is configured to open when a pressure of a fluid in the pressure build chamber is greater than a threshold pressure; wherein the pressure build chamber is configured to inject the gaseous fuel or supercritical fluid into an engine.

In yet another aspect, a machine may include a gas engine and a pressure build chamber in fluid communication with the gas engine and configured to heat a liquid fuel to a sufficient temperature to cause at least a portion of the liquid fuel to be converted into a gaseous fuel or supercritical fluid, wherein the pressure build chamber is further configured to increase a pressure of the gaseous fuel or supercritical fluid to a sufficient pressure in the pressure build chamber to inject the gaseous fuel or supercritical fluid into the gas engine.

Further and alternative aspects and features of the disclosed principles will be appreciated from the following detailed description and the accompanying drawings. As will be appreciated, the gaseous fuel or supercritical fluid systems, direct injection gas engine systems, and methods disclosed herein are capable of being carried out in other and different aspects, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
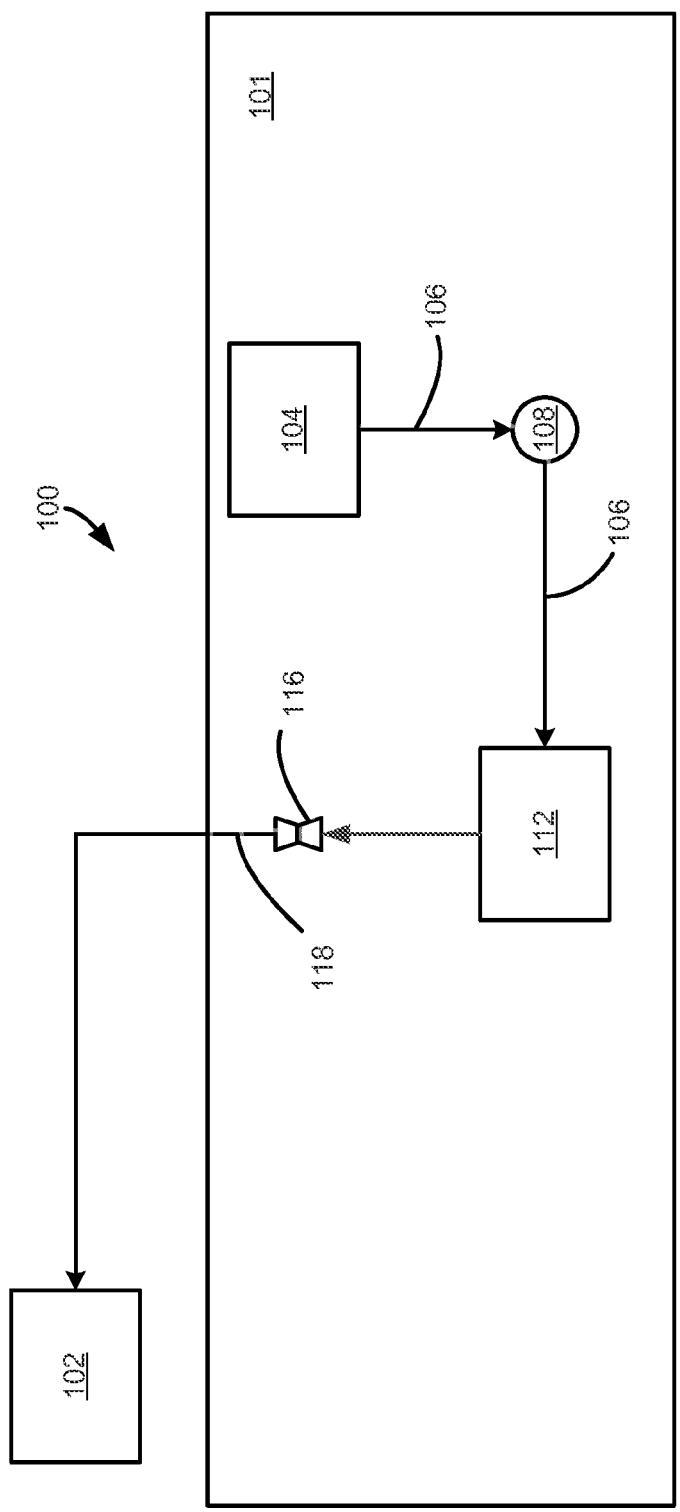
FIG. 1 is a schematic diagram of an aspect of a direct injection system for an engine in accordance with aspects of the disclosure.

Now referring to the drawings, wherein like reference numbers refer to like elements, there is illustrated a machine 100 with a system 101 (e.g., direct injection system) and an engine 102. The engine 102 is configured to combust a fuel to release the chemical energy therein and convert that energy to mechanical power. The machine 100 can be an "over-the-road" vehicle such as a truck used in transportation or may be any other type of machine that performs some type of operation associated with an industry such as mining, construction, farming, transportation, or any other industry known in the art. For example, the machine 100 may be an off-highway truck, earth-moving machine, such as a wheel loader, excavator, dump truck, backhoe, motor grader, material handler or the like. The term "machine" can also refer to stationary equipment like a generator that is driven by an internal combustion engine to generate electricity. The machine 100 can also refer to a locomotive, and engine 102 may be a DIG engine.

FIG. 1 is a schematic diagram of an aspect of the system 101 for the engine 102, which may be on the machine 100. The system 101 may be configured to store and supply the engine 102 with fuel (e.g., natural gas) for a combustion process. Components of the system 101 may be disposed on the machine 100 and/or may be disposed apart from the machine 100 and in selective fluid communication with the engine 102. As shown, the system 101 may include a liquid fuel tank 104 (e.g., cryogenic tank, holding tank, etc.) in fluid communication with a booster pump 108, for example, via a fuel line 106. The fuel tank 104 may be configured to store fuel, such as natural gas, at a temperature and pressure so that the fuel is in a liquid phase (e.g., LNG). The booster pump 108 may facilitate a flow of the liquid fuel from the liquid fuel tank 104 to a pressure build chamber 112. In one aspect, the booster pump 108 may generate sufficient pressure (e.g., about 0.5 MPa-1 MPa) to move the liquid fuel from the liquid fuel tank 104 to the pressure build chamber 112.

In the pressure build chamber 112, a volume of the liquid fuel is heated to a sufficient temperature to cause at least a portion of the volume of the fuel in a liquid phase to be converted into a gaseous or supercritical phase, for example, based on the pressure-temperature curve associated with the particular fuel (e.g., LNG). As an example, the pressure build chamber 112 may be a constant volume heat exchanger. As such, thermal energy may be transferred to the fuel in the pressure build chamber 112 and a pressure within the pressure build chamber 112 may increase. As an example, the pressure in the pressure build chamber 112 may increase to a sufficient pressure (e.g., 30-50 MPa) such that the fuel may be released from the pressure build chamber 112 (e.g., injected into the engine 102) in a gaseous or supercritical phase (i.e., as gaseous fuel).

The pressure build chamber 112 may be any heat exchanger sufficient to withstand the pressure generated inside during the process of converting the liquid fuel to a gaseous phase and/or supercritical fluid. For example, the pressure build chamber 112 may be constructed as a constant volume heat exchanger, which may be a tube and shell heat exchanger or a primary surface heat exchanger. Various tube and shell configurations may be used including various flow paths for fluids. In an aspect, with a tube and shell heat exchanger, the tubes may have fins to further increase the surface area of the tubes. As an example, in an aspect where the pressure build chamber 112 is a tube and shell heat exchanger, the liquid fuel may flow through the tubes and a heat transfer fluid may flow through the shell of the tube and shell heat exchanger thereby transferring thermal energy from the heat transfer fluid to the liquid fuel. As another example, the liquid fuel may flow through the shell and the heat transfer fluid may flow through the tubes of the tube and shell heat exchanger. As discussed in more detail below with respect to FIG. 2, the heat transfer fluid may use heat from the engine 102 to accomplish heating of the contents (e.g., liquid fuel) of the pressure build chamber 112.

A pressure control valve 116 may be in fluid communication with the pressure build chamber 112. As an example, the pressure control valve 116 may be disposed to provide a controlled release of contents of the pressure build chamber 112 based upon a configuration (e.g., actuation pressure, left pressure, threshold pressure, etc.) of the pressure control valve 116. In operation, as the contents of the pressure build chamber 112 are heated, a pressure in the pressure build chamber 112 may be increased to a threshold pressure, thereby causing the pressure control valve 116 to open. As an example, when the pressure control valve 116 opens, at least a portion of the contents (e.g., gaseous or supercritical fuel) of the pressure build chamber 112 may exit the pressure build chamber 112, for example via an injection line 118. The threshold pressure may be any suitable pressure sufficient to create a flow of gaseous or supercritical fuel to the engine 102 without requiring a separate high pressure booster pump to pressurize the fuel to injection pressures. As an example, the threshold pressure may between about 30 MPa and about 50 MPa, including endpoints with such range. As another example, the threshold pressure may be about 34.5 MPa. As a further example, the threshold pressure may be about 42 MPa. In certain aspects, the threshold pressure may be configured to be at least twice the pressure of the maximum cylinder pressure of the engine 102. For example, the threshold pressure may be configured to ensure injection of the gaseous or supercritical fuel into the engine combustion chamber remains sonic. As a further example, a threshold pressure of at least twice the pressure of the maximum cylinder pressure of the engine 102 may permit an independent inject rate from fluctuation in cylinder pressure. Other threshold pressures may be used to effect such conditions.

In certain aspects, after at least a portion of the contents of the pressure build chamber 112 have be released from the pressure build chamber 112 (e.g., via pressure control valve 116), the booster pump 108 again fills the pressure build chamber 112 with liquid fuel from liquid fuel tank 104 in a batch type of process. As will be discussed below, one or more sensors may be used to determine conditions such as temperature and pressure in the pressure build chamber 112 to determine the presence and/or the condition (e.g., phase) of fluids within the pressure build chamber 112. As such, the discharge and filling of the pressure build chamber 112 may be controlled based at least on such determined conditions.

Figure 2:
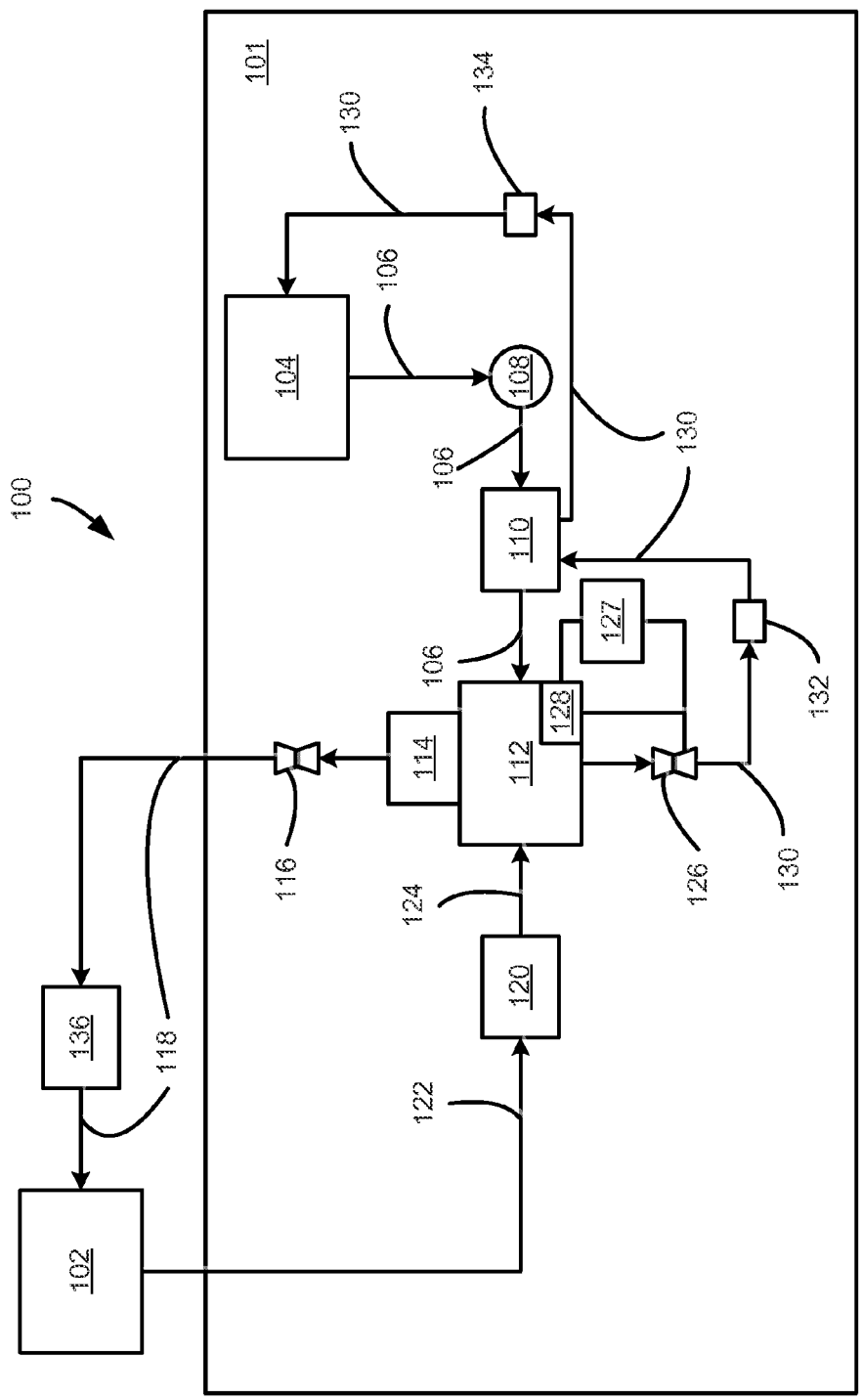
FIG. 2 is a schematic diagram of another aspect of a direct injection system for an engine in accordance with aspects of the disclosure.

FIG. 2 is a schematic diagram of another aspect of the system 101 of the present disclosure. As shown in FIG. 2, a separator 114 may be in fluid communication with the pressure build chamber 112. For example, the separator 114 may be disposed to receive at least a portion of the contents of the pressure build chamber 112 when a pressure in the pressure build chamber 112 has reached the pressure threshold. As another example, the separator 114 may be in fluid communication with the pressure control valve 116 and may receive at least a portion of the contents of the pressure build chamber 112 based upon a state (e.g., actuation, lift position, etc.) of the pressure control valve 116. As a further example, the separator 114 may be configured to receive at least a portion of the contents of the pressure build chamber 112 and to separate at least a portion of gaseous fuel or supercritical fluid from any remaining liquid fuel (e.g., before supplying the gaseous or supercritical fuel to the engine 102). The separator 114 may be any sufficient separator, such as a cyclone separator. In certain aspects, the pressure build chamber 112 may include a configuration of a smaller cylinder deposed inside of a larger cylinder with separation capability, which may be used to eliminate or reduce the need for the separator 114. Other configurations of separators may be used.

In certain aspects, the contents (e.g., liquid fuel) in the pressure build chamber 112 may enter at temperatures of about −160° C. Accordingly, the thermal and phase properties of any heat transfer fluids used to heat the contents of the pressure build chamber 112 may be configured to maintain certain pre-defined conditions (e.g., fluid state). For example, heat from the engine 102 may be transferred via an engine coolant or other fluid medium and may be used to heat the contents of the pressure build chamber. As a another example, since typical engine coolant may freezes at temperate of −40° C., an intermediate fluid may be used as the heat transfer fluid, where the intermediate fluid (e.g., a propylene derivative, an ethylene derivative, etc.) would remain liquid when exposed to heat transfer fluids at low temperatures (about −160° C.). As a further example, the intermediate fluid may be in thermal communication with the engine 102 (e.g., and/or an engine coolant) through an intermediate source, such as a conditioner 120 (e.g., fluid conditioner, heat exchanger, etc.). In certain aspects, the heat transfer fluid may be any intermediate fluid heated by the engine coolant, or any fluid sufficient to transfer heat from the engine coolant to the liquid fuel, such as pure propylene glycol, ethylene glycol, etc., for example. As shown, engine coolant may be in fluid communication with the conditioner 120 through a coolant line 122, and the intermediate fluid may be in fluid communication with the conditioner 120 through a heat transfer fluid line 124.

The conditioner 120 may be constructed as a heat exchanger, which may be a tube and shell heat exchanger or a plate heat exchanger. Various heat exchanger configurations may be used including various flow paths for fluids. In an aspect, with a tube and shell heat exchanger, the tubes may have fins to further increase the surface area of the tubes. As an example, in an aspect where the conditioner 120 is a tube and shell heat exchanger, the intermediate fluid may flow through the tubes and the engine coolant may flow through the shell of the tube and shell heat exchanger thereby transferring thermal energy from the engine coolant to the intermediate fluid. As another example, the intermediate fluid may flow through the shell and the engine coolant may flow through the tubes of the tube and shell heat exchanger.

In an aspect as shown in FIG. 2, a pre-heating conditioner 110 may be disposed in fluid communication with the pressure build chamber 112. As an example, the pre-heating conditioner 110 may be disposed between the liquid fuel tank 104 and the pressure build chamber 112. As such, the pre-heating conditioner 110 may receive liquid fuel from the liquid fuel tank 104 and may facilitate the heating of the liquid fuel prior to entering the pressure build chamber 112. As a further example, the booster pump 108 may be in fluid communication with a pre-heating conditioner 110, where the booster pump 108 supplies the liquid fuel to the pre-heating conditioner 110 first, before the liquid fuel enters the pressure build chamber 112. However, various configurations and flow controls may be used to move the fuel through the system 101.

In an aspect, the pre-heating conditioner 110 may be configured to facilitate a transfer of thermal energy to the liquid fuel or other fluid in the pre-heating conditioner 110. As an example, the pre-heating conditioner 110 may be constructed as a heat exchanger, such as a primary surface heat exchanger, a plate heat exchanger, or the like. As such, the liquid fuel or other fluid in the pre-heating conditioner 110 may receive thermal energy from an exterior environment or fluid in thermal communication with the contents of the pre-heating conditioner 110. As an example, a return line 130 may provide fluid communication between the pressure build chamber 112 and the pre-heating conditioner 110, whereby at least a portion of the contents of the pressure build chamber 112 may exit the pressure build chamber 112 and may pass through the pre-heating conditioner 110 as a source of thermal energy. As a further example, the contents of the pressure build chamber 112 flowing through the return line 130 may include gaseous fuel, supercritical fluid (fuel), and/or other heated fluids and may be routed to the liquid fuel tank 104. As such, the pre-heating conditioner 110 may facilitate the cooling of the fluid in return line 130 by allowing the transfer of thermal energy to the liquid fuel in the pre-heating conditioner 110. In certain aspects, the pre-heating conditioner 110 facilitates the transfer of thermal energy between separate fluids, for example, using tubes, baffles, spacers, chambers, shells, and the like to maintain fluid separation between the fluids. Other configurations and thermal sources (e.g., fluids) may be used.

In some aspects, a valve 126 (e.g., bleed valve, solenoid valve, etc.) may be disposed to control a flow of fluid from the pressure build chamber 112 through the return line 130. As an example, the valve 126 may be configured to release at least a portion of the contents of the pressure build chamber 112 upon actuation of the valve 126. As a further example, the valve 126 may be actuated by a controller 127, where the controller 127, for example in response to information received from one or more sensors 128. Fluid passing through the valve 126 may be returned to the liquid fuel tank 104, for example, via return line 130, which may pass through addition components of the system 101.

In certain aspects, the liquid fuel in the pressure build chamber 112 may be heated to gaseous fuel and/or supercritical fluid. As discussed herein, at least a portion of the gaseous fuel and/or supercritical fluid may be released via the pressure control valve 116. However, contents remaining in the pressure build chamber 112 may continue to increase in temperature and/or the pressure within the pressure build chamber 112 may continue to rise. Accordingly, The sensor 128 may detect the internal conditions (e.g., liquid level, pressure, temperature, etc.) of the pressure build chamber 112. For example, the sensor 128 may be a pressure sensor that detects the gaseous fuel or supercritical fluid pressure in the pressure build chamber 112, a temperature sensor that detects the temperature in the pressure build chamber 112, or a level sensor that detects the amount of liquid fuel in the pressure build chamber 112. As such, the controller 127 may receive information from the sensor 128 and may cause the valve 126 to actuate to release at least a portion of the remaining contents of the pressure build chamber 112. In other aspects, after the gaseous fuel and/or supercritical fluid has been discharged from the pressure build chamber 112 via the pressure control valve 116, the pressure build chamber 112 may be re-filled with liquid fuel from the liquid fuel tank 104. As the pressure build chamber 112 is being filled, residual gaseous fuel and/or supercritical fluid may be created by flash boiling during the filling process and may be ejected out of the valve 126.

A first orifice 132 may be positioned in the return line 130 and may be configured as a thermo-static expansion valve (TXV) to reduce the pressure and/or temperature of fluid in the return line 130 such as gaseous fuel and/or supercritical fluid released from the pressure build chamber 112. A second orifice 134 may be positioned in return line 130 and may be configured as a thermo-static expansion valve (TXV) to reduce the pressure and/or temperature of fluid in the return line 130 such as gaseous fuel and/or supercritical fluid released from the pressure build chamber 112. In some aspects, the first orifice 132 and/or the second orifice 134 may be used to adiabatically drop the pressure of the fluid (e.g., gaseous fuel and/or supercritical fluid) flowing in the return line 130 to lower a temperature of fluid before returning to the liquid fuel tank 104.

The system 101 may include a conditioner 136 to further increase the temperature of the gaseous or supercritical fuel before being injected into the engine 102. In an aspect, the conditioner 136 may be in fluid communication with the engine 102 and the pressure control valve 116 via the injection line 118. In certain aspects, the temperature of the gaseous or supercritical fuel may be increased via the conditioner 136 to a temperature from about 25° C. to about 40° C.

The conditioner 136 may be constructed as a heat exchanger, such as a tube and shell heat exchanger or a plate heat exchanger. In an aspect with a tube and shell heat exchanger, the tubes may have fins to further increase the surface area of the tubes. Two fluids, each with a different initial temperature, may flow through the conditioner 136, where one fluid may be the gaseous or supercritical fuel, and the other fluid may be a heat transfer fluid. In some aspects, the heat transfer fluid may be an intermediate fluid, which may be the same or similar fluid as discussed above in regard to the conditioner 120. As an example, in an aspect where the conditioner 136 is a tube and shell heat exchanger, the intermediate fluid may flow through the tubes and the gaseous or supercritical fuel may flow through the shell of the tube and shell heat exchanger. In another aspect, the intermediate fluid may flow through the shell and the gaseous or supercritical fuel may flow through the tubes of the tube and shell heat exchanger.

In certain aspects, a ratio of the liquid fuel density to the gaseous or supercritical fuel density in the pressure build chamber 112 may be greater than 400:1 (before evaporating a portion of the liquid fuel) to allow for desired pressures to build in the pressure build chamber 112 as the liquid fuel converts to a gaseous and/or supercritical phases. Once the gaseous or supercritical fuel in pressure build chamber 112 is discharged to the engine 102, about 0.25% of mass of the gaseous or supercritical fuel may remain in the pressure build chamber 112, and then may be returned to the liquid fuel tank 104 to be recycled back into the system. The percent of gaseous or supercritical fuel returned may be, for example, from about 0.25% to about 2%, due to the amount of additional gaseous or supercritical fuel created when the liquid fuel is first pumped in to the pressure build chamber 112, evaporating some of the liquid fuel.

Any number of pressure build chambers can be used as needed to optimally provide high pressure gaseous or supercritical fuel to the engine. In one aspect, multiple pressure build chambers 112 can be arranged in parallel and, optionally, in fluid communication with one or more of the pre-heating conditioner 110 and the booster pump 108. In certain aspects, the multiple pressure build chambers 112 may be at different stages of the fueling process to enable a continuous or substantially continuous supply of gaseous or supercritical fuel to the engine 102. For example, the multiple pressure build chambers 112 can be filled at different times from each other, such that at least one pressure build chamber 112 may be able to supply gaseous or supercritical fuel to the engine 102. Accordingly, the one or more pressure build chambers 112 allows the system 101 to provide gaseous fuel to the engine 102 without requiring a separate high pressure booster pump to pressurize the fuel to injection pressures.

INDUSTRIAL APPLICABILITY

Figure 3:
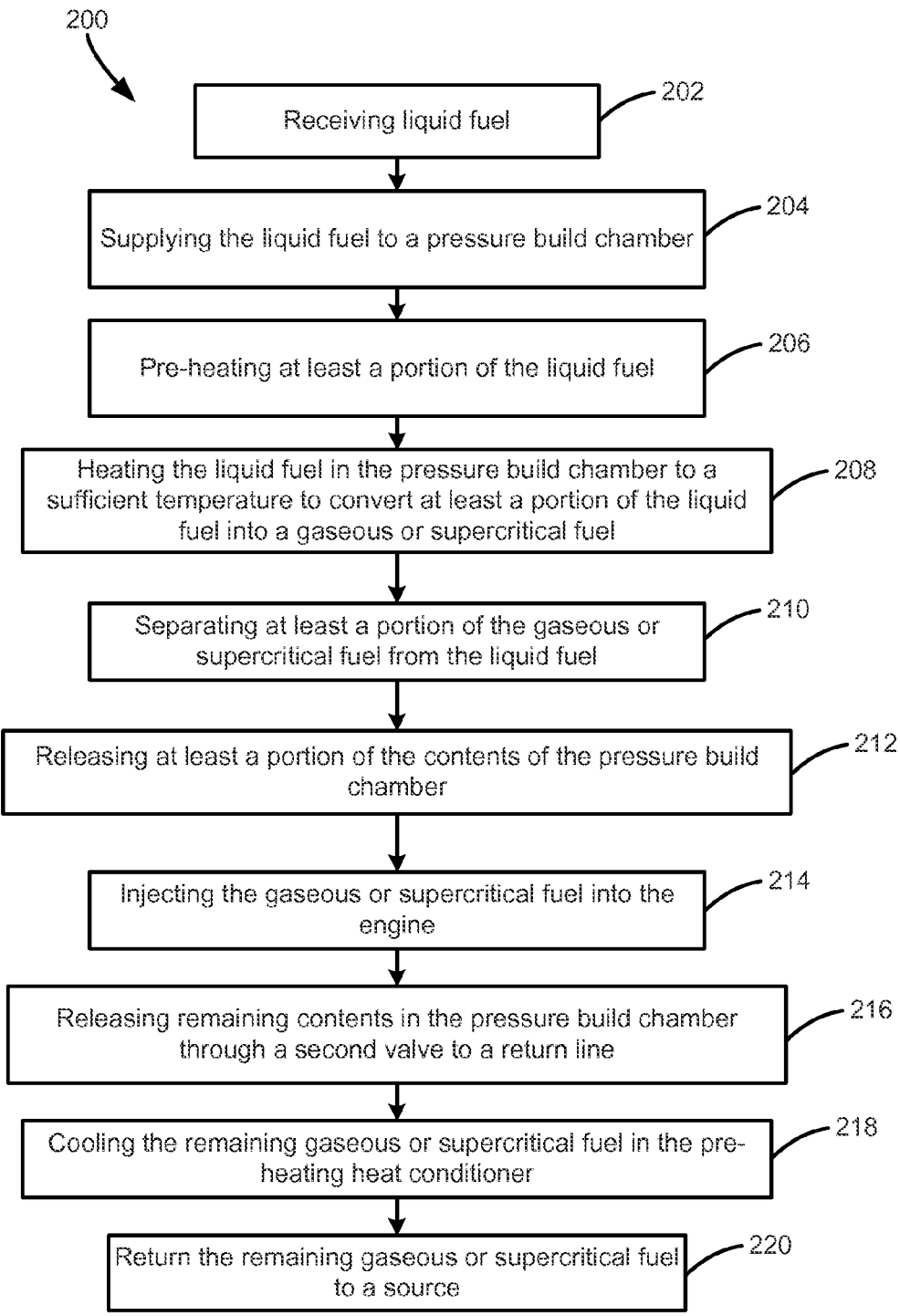
FIG. 3 is a flow chart of a method for pressurizing gaseous fuel or supercritical fluid to an injection pressure in a direct injection system in accordance with aspects of the disclosure.

The system 101 may be used with various engines (e.g., engine 102) and machines (e.g., machine 100) including mobile and stationary machines and equipment. FIG. 3 illustrates an example method 200 for pressurizing gaseous or supercritical fuel to an injection pressure in the system 101 according to aspects of the present disclosure. With references to FIGS. 1-3, at step 202, an amount of liquid fuel may be received from a source such as a container (e.g., the liquid fuel tank 104). At step 204, the liquid fuel may be supplied to the pressure build chamber 112, for example, by the booster pump 108 or other motive force. In certain embodiments, at step 206, the liquid fuel may be pre-heated, for example, in the pre-heating conditioner 110, where the pre-heating conditioner 110 is in fluid communication with the source of liquid fuel and the pressure build chamber 112. As a further example, at least a portion of the liquid fuel may be pre-heated prior to entering the pressure build chamber 112. However, other configurations may be used.

The liquid fuel (pre-heated or otherwise) may be heated in the pressure build chamber 112, at step 208. As an example, at least a portion of the liquid fuel may be heated in the pressure build chamber 112 to a sufficient temperature to convert at least a portion of the liquid fuel into a gaseous or supercritical fuel. In certain aspects, the pressure build chamber 112 may be a constant volume heat exchanger. The liquid fuel in the pressure build chamber 112 may be heated by an intermediate fluid, which may be in thermal communication with an engine coolant.

In certain aspects, the generated gaseous or supercritical fuel may be further heated to increase pressure inside the pressure build chamber 112. At step 210, gaseous or supercritical fuel may be separated from the liquid fuel, for example, via the separator 114 in fluid communication with the pressure build chamber 112.

At step 212, at least a portion of the contents of the pressure build chamber 112 may be released (e.g., caused to exit) from the pressure build chamber 112. As an example, the pressure control valve 116 (e.g., in fluid communication with the separator 114) may be caused to open when the gaseous or supercritical fuel pressure is greater than a threshold pressure, thereby releasing at least a portion of the contents of the pressure build chamber 112. As a further example, the threshold pressure may be sufficient to inject the gaseous or supercritical fuel into an engine 102. At step 214, the gaseous or supercritical fuel may be injected into the engine 102, for example under pressure from the pressure build chamber 112.

At step 216, the remaining gaseous or supercritical fuel in the pressure build chamber 112 may be released, for example, through the valve 126, to return the remaining gaseous or supercritical fuel to the liquid fuel tank 104 through the return line 130. The remaining gaseous or supercritical fuel may be cooled in the pre-heating conditioner 110, at step 218, before the remaining gaseous or supercritical fuel is returned to the liquid fuel tank 104. In certain aspects, the remaining gaseous or supercritical fuel is then returned to a source such as the liquid fuel tank 104, at step 220.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A system comprising:
   a source of liquid fuel; and
   a pressure build chamber in fluid communication with the source of liquid fuel such that the pressure build chamber is configured to receive a volume of liquid fuel from the source,
   a pre-heating conditioner disposed in fluid communication between the source of liquid fuel and the pressure build chamber, wherein the pre-heating conditioner is configured to heat a portion of the liquid fuel,
   a return line in communication with the pressure build chamber and the heating pre-conditioner, wherein at least a portion of the liquid fuel in the pressure build chamber exits the pressure build chamber and passes through the pre-heating conditioner as a source of thermal energy for heating the liquid fuel,
   wherein the pressure build chamber is configured to heat a portion of the volume of liquid fuel to a sufficient temperature to convert the portion of the volume of liquid fuel into a gaseous fuel, and
   wherein the pressure build chamber is configured to increase a pressure of a fluid in the pressure build chamber to a threshold pressure to inject the gaseous fuel into an engine.

2. The system of claim 1, wherein the liquid fuel is liquefied natural gas.

3. The system of claim 1, further comprising a booster pump in fluid communication with the pressure build chamber, wherein the booster pump is configured to cause the liquid fuel to flow toward the pressure build chamber.

4. The system of claim 1, wherein the pressure build chamber is configured to heat the liquid fuel using a heat transfer fluid in thermal communication with the engine.

5. The system of claim 4, further comprising a heat conditioner in fluid communication with the pressure build chamber, wherein the heat conditioner is configured to transfer thermal energy from an engine coolant to the heat transfer fluid.

6. The system of claim 1, further comprising a separator in fluid communication with the pressure build chamber, wherein the separator separates at least a portion of the gaseous fuel from the liquid fuel.

7. The system of claim 1, further comprising a pressure control valve in fluid communication with the pressure build chamber, wherein the pressure control valve is configured to open when the contents in the pressure build chamber is greater than the threshold pressure.

8. The system of claim 7, wherein the threshold pressure is between about 30 MPa and about 50 MPa.

9. The system of claim 7, wherein the threshold pressure is between about 40 MPa and about 45 MPa.

10. The system of claim 7, further comprising a bleed valve in the return line, wherein the bleed valve is configured to release at least a portion of the contents of the pressure build chamber in response to a condition of the pressure build chamber.

11. The system of claim 10, further comprising a sensor configured to detect one or more of a pressure, a temperature, and a fluid level in the pressure build chamber, wherein the bleed valve is actuated to release at least a portion of the contents of the pressure build chamber in response to information detected by the sensor.

12. The system of claim 10, wherein the bleed valve is a solenoid actuated valve.

13. The system of claim 10, wherein the return line is in fluid communication with the source of liquid fuel.

14. The system of claim 13, further comprising a thermostatic expansion valve in fluid communication with the return line.

15. The system of claim 1, wherein the pressure build chamber is a constant volume heat exchanger.

16. The system of claim 1, wherein the pressure build chamber is a tube and shell heat exchanger.

17. A system comprising:
    a container including a liquid fuel;
    a pressure build chamber in fluid communication with the container and configured to receive a volume of liquid fuel from the container, wherein the pressure build chamber is configured to heat a portion of the volume of liquid fuel to a sufficient temperature to convert the portion of the volume of liquid fuel into a gaseous;
    a booster pump in fluid communication with the container and the pressure build chamber, wherein the booster pump is configured to cause the liquid fuel to flow toward the pressure build chamber;
    a pre-heating conditioner disposed in fluid communication between the container and the pressure build chamber, wherein the pre-heating conditioner is configured to heat a portion of the liquid fuel,
    a return line in communication with the pressure build chamber, the heating pre-conditioner and the container, wherein at least a portion of the liquid fuel in the pressure build chamber exits the pressure build chamber and passes through the pre-heating conditioner as a source of thermal energy for heating the liquid fuel, a separator in fluid communication with the pressure build chamber, wherein the separator is configured to separate, at least a, portion of the gaseous fuel from the liquid fuel; and a valve in fluid communication with the separator, wherein the valve is configured to open when a pressure of a fluid in the, pressure build chamber is greater than a threshold pressure, wherein the pressure build chamber is configured to inject the gaseous fuel into an engine.

18. The system of claim 17, wherein the threshold pressure is between about 30 MPa and about 50 MPa.

19. A machine comprising:

a gas engine;

a pressure build chamber in fluid communication with the gas engine and configured to heat a liquid fuel to a sufficient temperature to cause at least a portion of the liquid fuel to be converted into a gaseous fuel, wherein the pressure build chamber is further configured to increase a pressure of the gaseous fuel to a sufficient pressure in the pressure build chamber to inject the gaseous fuel into the gas engine;

a pre-heating conditioner disposed in fluid communication between a source of liquid fuel and the pressure build chamber, wherein the pre-heating conditioner is configured to heat a portion of the liquid fuel; and a return line in communication with the pressure build chamber and the heating pre-conditioner, wherein at least a portion of the liquid fuel in the pressure build chamber exits the pressure build chamber and passes through the pre-heating conditioner as a source of thermal energy for heating the liquid fuel.

* * * * *